March 5, 1935.  H. B. ROGERS  1,993,684
COOLING DEVICE FOR AUTOMOBILES AND WINDSHIELD WATER SUPPLY
Filed June 9, 1933

WITNESSES

INVENTOR
H. B. Rogers
BY
ATTORNEYS

Patented Mar. 5, 1935

1,993,684

UNITED STATES PATENT OFFICE 1,993,684

COOLING DEVICE FOR AUTOMOBILES AND WINDSHIELD WATER SUPPLY

Horace B. Rogers, Norfolk, Va.

Application June 9, 1933, Serial No. 675,135

2 Claims. (Cl. 296—1)

My invention relates to improvements in means for cooling the interior of automobiles of the enclosed type and for affording a source of water supply for cleaning windshields and it consists in the combinations, constructions and arrangements herein described and claimed.

It is the common experience of drivers of automobiles of the enclosed type, such as sedans, coupes, coaches, etc., that the heat absorbed by the low roof over a driver's head tends to create a highly heated area which adds to the discomfort of driving in hot weather and may cause headaches or heat exhaustion. This is especially true when a long trip is being taken on a highway with the sun beating down on the vehicle.

On cross-country trips where a car is being driven at quite a speed the windshield will become covered with the remains of insects which have been struck, thus obstructing the vision of the driver and rendering driving unsafe.

An object of my invention is to provide means whereby the temperature in the vicinity of the driver's head and of any other occupant of the front seat may be appreciably lowered so that driving may be done with comfort even on a day in which the sun is beating down on the top of the vehicle.

A further object is to provide a cooling means comprising a water tank which is hidden from sight between the outer covering of the top of the vehicle and the inner lining, thus obviating any unsightly appearance.

A further object is to provide a source of water supply for the windshield wiper whereby any dust, dirt, or the remains of any insects can be washed off by the windshield wiper without the necessity of leaving the car and without the necessity of even lessening the speed of the vehicle.

A further object is to provide a tank in close proximity to the heat-absorbing top of the car which will not only prevent direct radiation from the top to the occupants but which can be supplied with cold water to actually absorb any such heat and which can be drained and replenished with additional cold water when desired.

Other objects and advantages will appear in the following specification and the novel features of the invention will be particularly pointed out in the appended claims.

My invention is illustrated in the accompanying drawing forming part of this application, in which:—

Figure 1:
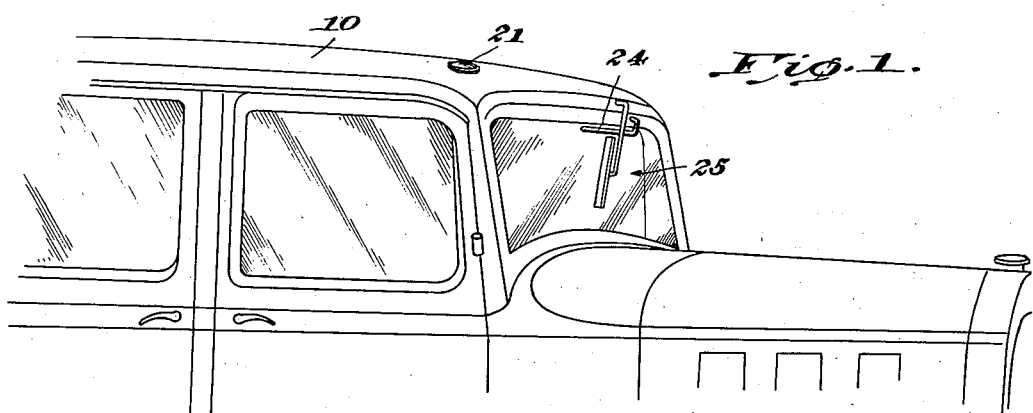
Figure 2:
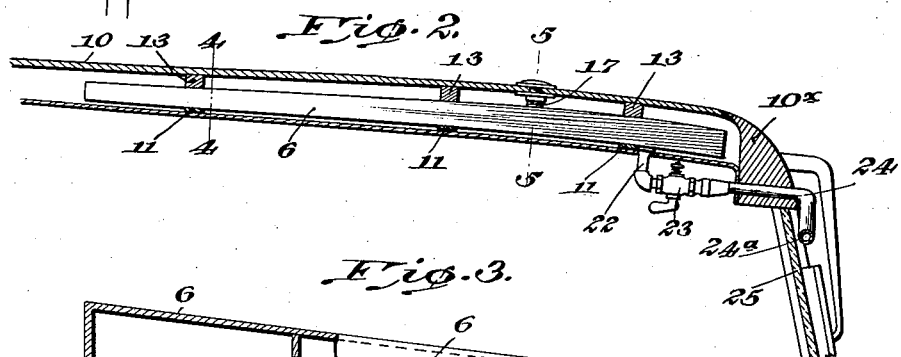
Figure 3:
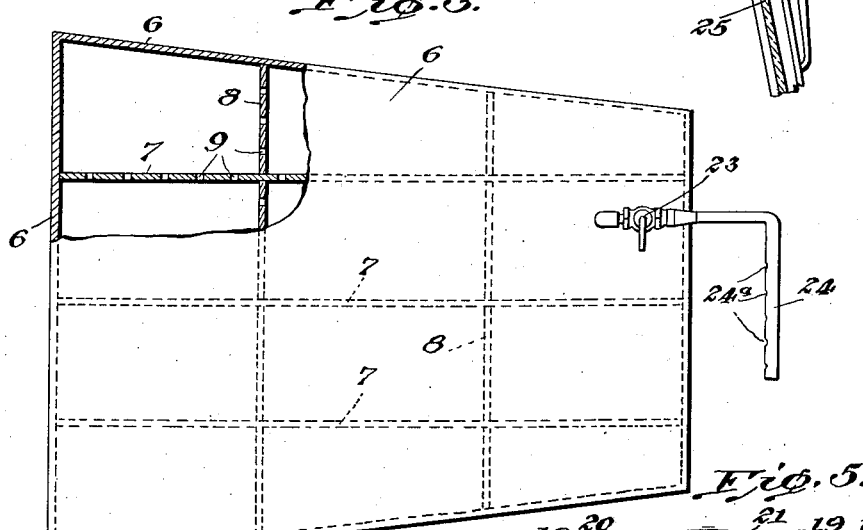
Figure 4:
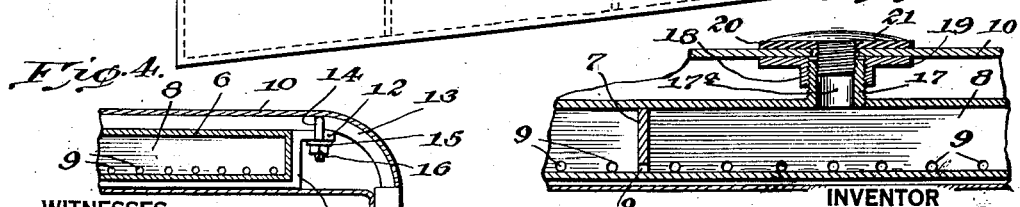
Figure 5:
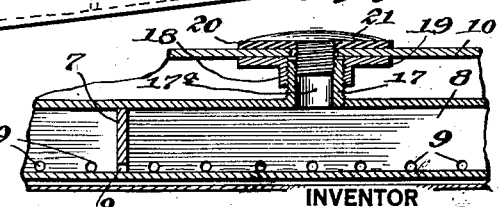

Figure 1 is a perspective view of a portion of an automobile showing my invention applied thereto, Figure 2 is an enlarged longitudinal section of a portion of the automobile top and windshield showing the relative positions of the tank and windshield water supply, Figure 3 is a bottom plan view of the water supply tank, a portion being in section to show the interior construction, Figure 4 is a fragmentary section along the line 4—4 of Figure 2, and Figure 5 is an enlarged fragmentary section along the line 5—5 of Figure 2.

Referring more particularly to Figure 3 it will be seen that that I have provided a tank, which is preferably made of metal, having exterior walls 6 and which is shaped to conform to the general shape of the forward end of the top of the car. This tank, as will be observed, is provided with longitudinal partitions 7 and transverse partitions 8, said partitions each being provided with a plurality of small openings 9. The purpose of these partitions is to prevent undue movement of the water in the tank occasioned by the change in movement of the car, such as by starting or stopping, or going around curves.

The tank, as shown in Figure 2, is disposed near the outer portion 10 of the top of the car. It is held in this position by means of U-shaped straps 11 (see Fig. 4) which have flanges 12 abutting the transverse bows 13 which form a portion of the frame of the top or cover of the automobile. These flanges 12 are in turn held by U-shaped bolts 14 which straddle the bow and the flange 12, a plate 15 being held by nuts, such as that shown at 16, firmly against the undersurface of the flange 12 as clearly shown in Fig. 4. In Fig. 2 I have shown three straps 11 but it is obvious that any suitable number might be used. The use of these straps 11 holds the tank securely in contact with the under portion of the transverse bow 13 and it also prevents any lateral movement.

A filler spout 17 is provided and this is threaded externally to receive an internally threaded portion 18 of a bearing plate 19 (see Fig. 5). The outer cover member 10 of the top has an opening registering with the opening 17ª of the member 17. A washer 20 is provided and the outer portion 10 of the top is clamped securely between the plate 19 and the washer 20 by means of a screw 21 which has an enlarged head, as clearly shown in Fig. 5.

The bottom of the tank is provided with an opening communicating with a drain pipe 22. A valve 23 is disposed near the top and this valve controls a pipe 24 which passes through the forward end 10ˣ of the top and is bent to deliver water to the glass 25 of the windshield through openings 24ᵃ.

From the foregoing description of the various parts of the device the operation thereof may be readily understood. On a hot day, where a trip of some length is to be taken, the screw 21 may be removed and the tank filled with cold water, the screw being replaced. Water itself is a medium which will tend to cut off radiation from a heated body and the cold water in this tank will provide a cool area in the vicinity of the driver's head and in the vicinity of the head of another occupant of the front seat, thus affording a comfortable ride, where without such a cooling means, the ride might be very uncomfortable from the heat radiating from the top.

If the windshield becomes foul by dust, dirt, or the remains of insects, it is only necessary to open the valve 23 and the water will be conducted to the windshield where the wiper, when set in motion, will clean it and thus render vision clear through the cleaned portion.

It will be seen that the drain 11, the valve 23, and the pipe 24 have a double function since they not only serve as a medium of water supply for the windshield but to drain the tank when it is desired to replenish it with cold water.

Of course, the tank may be used to provide solutions which will keep the windshield clear of snow and ice.

I am aware that to provide sources of solution for preventing the obstruction of the windshield by snow and ice are not broadly new, but in such devices as I have seen, the tanks are in plain sight, either on the outside of the car or on the inside and make an unsightly appearance. In the present invention the only parts in view are the drainage connections and these are inconspicuous.

I have spoken of the cooling of the interior of the vehicle by the tank of cold water above the heads of the occupants of the front seat, but it is also true that the evaporation of the water on the windshield greatly lowers the temperature of latter and adds greatly to the cooling effect.

I claim:

1. The combination with an automobile of the enclosed type, of a fluid-containing tank suspended from the bows of the automobile top beneath the outer cover and above the inner lining, means projecting through the top of the automobile for permitting the filling of the tank, a drain pipe connected with the bottom of the tank and projecting through the front of the top, said drain pipe terminating in front of the windshield and being provided with openings for delivering the fluid against the windshield and a control valve disposed within the automobile for draining the tank and for applying fluid to the windshield at will.

2. The combination with an automobile of the enclosed type, of a water tank suspended from the bows of the top between the outer cover and the inner lining, said tank being divided into a plurality of compartments having communication with one another, means extending through the top of the automobile for permitting the filling of the interior of the tank, a drain pipe connected with the bottom of the tank and passing through the front end of the top and terminating in an end substantially parallel with the windshield, said end having perforations facing the windshield for permitting the water in the tank to be projected upon the windshield, and a valve in said drain pipe disposed on the interior of the automobile for controlling the flow of water from the tank to the windshield.

HORACE B. ROGERS.